Oct. 6, 1925.
J. D. PIRTLE
1,556,025
MACHINE FOR REMOVING SKINS OF NUTS
Filed May 14, 1920
4 Sheets-Sheet 1

Jos. D. Pirtle
INVENTOR,
BY [signature]
ATTORNEY.

Oct. 6, 1925.

J. D. PIRTLE 1,556,025

MACHINE FOR REMOVING SKINS OF NUTS

Filed May 14, 1920     4 Sheets-Sheet 2

Jos. D. Pirtle,
INVENTOR,
By W. C. Duvall
ATTORNEY.

Oct. 6, 1925.

J. D. PIRTLE 1,556,025

MACHINE FOR REMOVING SKINS OF NUTS

Filed May 14, 1920    4 Sheets-Sheet 4

Jos. D. Pirtle,
INVENTOR,
BY
ATTORNEY.

Patented Oct. 6, 1925.

1,556,025

UNITED STATES PATENT OFFICE.

JOSEPH D. PIRTLE, OF CHICAGO, ILLINOIS.

MACHINE FOR REMOVING SKINS OF NUTS.

Application filed May 14, 1920. Serial No. 381,254.

*To all whom it may concern:*

Be it known that I, JOSEPH D. PIRTLE, a citizen of the United States, residing at Chicago, in the county of Cook and State of Illinois, have invented a new and useful Machine for Removing Skins of Nuts, of which the following is a specification.

My invention has for its object the production of an automatic machine of cheap and simple construction, comparatively speaking, and which is adapted to remove the skins from nuts, particularly almonds, as well as a novel method of operation in accomplishing the result.

This process here described is for the purpose of preparing almonds for salting, etc., in the production of what is known as "salted almonds" and for confectioners' use, and has heretofore been attended by considerable expense and labor as well as slowness of operation. By my machine, however, as will hereinafter appear, I avoid the necessity of employing hand-labor altogether in this operation, such machine operating automatically to remove the skins from the kernels, subsequent to a preliminary scalding of the latter, such machine, after such removal, ejecting the skins at one point and the thus prepared kernels at another point, the latter as soon as dried, being ready for use for any purpose whatever.

Other objects and advantages of the invention will hereinafter appear, and the novel features thereof will be particularly pointed out in the claims.

Referring to the drawings for a typification of one successful form of my machine:

The principal feature of my invention resides in the employment of two adjacent cylindrical rolls having surfaces of elastic material, such rolls being so relatively arranged and rotated at such relative speeds as will adapt them to permit of the passage there-between of a nut and during such passage, by reason of one roll rotating faster than the other, to remove from the nut its skin. It is upon this principle that my invention is predicated, the remainder of the invention being secondary. I would therefore have it understood that aside from the principal features of the invention, as herein-above noted, said invention is not limited to the details shown and now to be described.

I preferably employ a rectangular casing or cabinet 1, the opposite side-walls 2, of which project somewhat above the front and rear end-walls 3 and 4, respectively.

Figure 6:
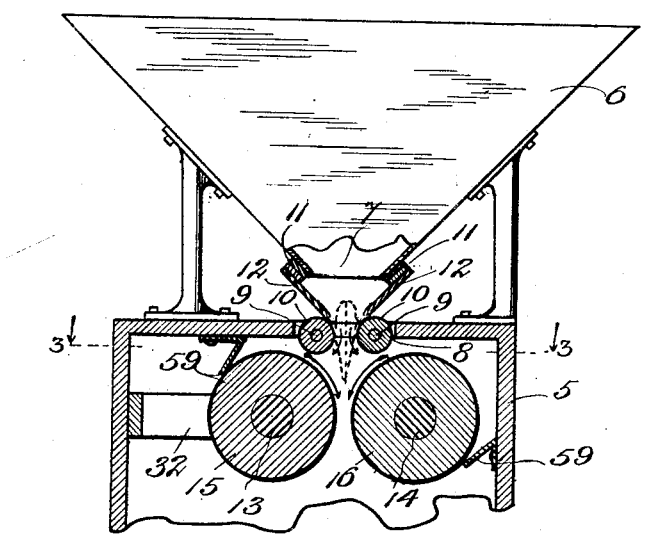
Fig. 6, is a sectional view on the line 6—6 of Fig. 4.

Supported above the open upper end of said cabinet and at the front thereof, is a rectangular box-like frame 5, open at top and bottom, and supported thereabove is a hopper 6, the walls of which converge to a point adjacent each other to produce a feed-opening 7, communicating with the opening 8 in the upper side of the frame 5. Within this opening 8, upon shafts 9, spaced apart, is mounted a pair of feed-rolls 10, preferably having a soft rubber surface and positioned a distance apart substantially agreeing with the narrowest width of the nut to be skinned, in the present example, an almond, so that said nuts are fed to the skinning rolls substantially endwise, as shown by dotted lines in Fig. 6.

In suitable guides arranged upon the exteriors and at the lower ends of the inclined side-walls of the hopper, is a pair of reciprocating plates 12. These guides, indicated as 11, may be of any design or construction adapted to support the plates 12 in a reciprocating manner, and the plates themselves are preferably though not necessarily, slightly convexed on their inner sides, and terminate immediately above the back of the inner peripheries of the rolls 10, heretofore mentioned (see Fig. 6).

In the opposite side-walls of the cabinet or casing 1, below the mechanism just described, is mounted a pair of parallel shafts 13 and 14 respectively, having soft rubber rolls 15 and 16 respectively. The surfaces of these rolls are spaced apart a distance slightly less than the narrowest width of the nut from which the skin is to be removed, and such space occurs directly below that existing between the superimposed rolls 10. The shaft 14 of the roll 16 is mounted in fixed bearings 17, located in the side walls of the cabinet and projected beyond one of said walls and having said projected end supported in a cross-bar 18. This extended portion of the shaft may carry a drive-pulley 19 and a smaller pulley 20, the former being connected by a belt 21, with the drive-shaft 22 of a motor 23, and the pulley 20 being connected by a belt 24 to a larger pulley 25 mounted on a transverse shaft 26 journaled in the opposite side walls of the cabinet or casing 1 below the frame 5 and at the front of the machine. The shaft 14 also carries a small gear-wheel 27, the same being upon the same end of the shaft as are mounted the pulleys 19 and 20, and at its opposite end said shaft may carry a cam-disk 28, upon the opposite faces of which are inclined cams 29. These cams are, as stated, at opposite sides of the disk and are adapted to alternately contact with opposite tracks 30 whereby, as will be evident, the shaft being rotated will in addition to such rotation, be reciprocated. The result of these two components in the motion of the roll 16 is a wiping effect upon the skin of the kernel that is largely lateral to the downward direction, or at a substantial angle to the imbedding pocket which the kernel forms for itself in the soft material of the rolls, consequently a more efficient separation of the skin from the kernel. As will be seen from the description of the connections which drive the rolls 15 and 16, it is the faster of the two members which receive this compound movement.

The companion-shaft 13, is mounted in preferably horizontally elongated bearings 31, likewise mounted in the opposite side-walls of the cabinet 1. This shaft is connected at the opposite ends of its roll 15, to a horizontally disposed yoke 32, through the medium of which the shaft and its roll may be adjusted to and from the roll 15, so that the space between said rolls 15 and 16 may be increased or diminished to operate upon different nuts or kernels and to obtain the best results. Any means may be employed for securing this adjustment of the yoke and roll carried thereby, as for instance, a threaded shaft 33, operating in a threaded opening 34, in the yoke, and operated by a knob or handle 35, upon the exterior and at the front end of the machine.

Figure 5:
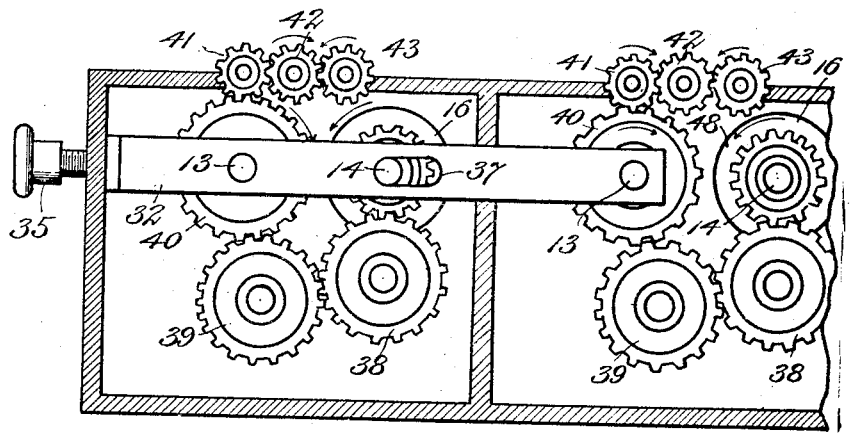
Fig. 5, is a vertical sectional view on the line 5—5 of Fig. 4.

In order to increase the capacity of this machine, the mechanism described and to be described, may be duplicated. (See Fig. 5). In such instance, the terminals 36 of the yoke 32, would be connected to each of the shafts 13, and also slotted, as at 37, so as to receive the ends of the drive-shafts 14. By duplicating this mechanism it will be seen that the capacity of the machine may be increased to any desired degree.

Below the drive-shaft 14, and meshing therewith, is an idle-gear 38, and this in turn meshes with a companion idle-gear 39, which meshes with and drives a gear 40, mounted on the end of the shaft 13. The latter gear meshes with and drives a smaller gear 41, which through the medium of a small idler 42 meshes with and drives a gear 43, which is a companion to the gear 41, so that these two gears, which are mounted upon the ends of the shafts 9, serve to rotate said shafts in reverse directions, and the gears 38 and 39, serve to rotate the shafts 13 and 14 and the rolls carried thereby in reverse directions and in directions corresponding to the rolls 10. It will be noted that the gears 38, 39 and 40 are of the same size, whereas the drive connection between gear 38 and shaft 14 is of a ratio to cause shaft 14 to travel faster than shaft 13, for the purpose of causing a circumferential wiping action of the rolls upon the skins of the nuts.

The plates 12, heretofore mentioned, are connected at their opposite ends, and projecting therefrom at one of said ends is a stud 44, which extends through an apertured keeper 45, secured to the framework. A coiled-spring 46, is mounted on the stud between the keeper and the transverse connection of the plates 12, said spring serving to normally force the plates in their ways to the opposite side of the machine. At said opposite side of the machine a pin 47 projects, the outer end of the pin travelling in undulations 47$^a$, that may be formed at the inner side and annularly of the gear 40. By this arrangement, as will be obvious, as the shaft 13 and its gear 40 are rotated, the plates 12 will be forced to the opposite side of the machine by the action of the undulations or cams 47$^a$ against the end of the pin 47, and when relieved of this said plates will be thrown by the spring 46 in an opposite direction. In this manner the plates 12 are rapidly vibrated or reciprocated so as to agitate the nuts within the hopper.

Mounted transversely in bearings at the rear of the machine and paralleling the shaft 26, heretofore mentioned is a shaft 48. The shafts 26 and 48 carry rolls 49 and 50 respectively, and over these rolls operates an endless delivery-apron 51, below the rear end of which may be positioned an inclined discharge 52.

Any ordinary type of exhaust-fan 53, may be supported upon the platform 54, of the casing, below the delivery-apron heretofore mentioned. This fan may be operated by a belt 55, running from the motor-shaft to a pulley 56 on the fan-shaft of the exhaust-fan. One or more exhaust-pipes 57, may extend from the exhaust-fan upwardly along one side of the delivery-apron, such pipes having their upper ends at points above the apron bent at an angle and terminating close to said apron, for which purpose a superimposed platform 58 is slotted for the purpose of receiving the ends of said pipes.

This completes a detailed description of one simple form or typification of an apparatus comprehending the principle of my invention and which, as before stated, is subject to many variations and modifications.

Figure 1:
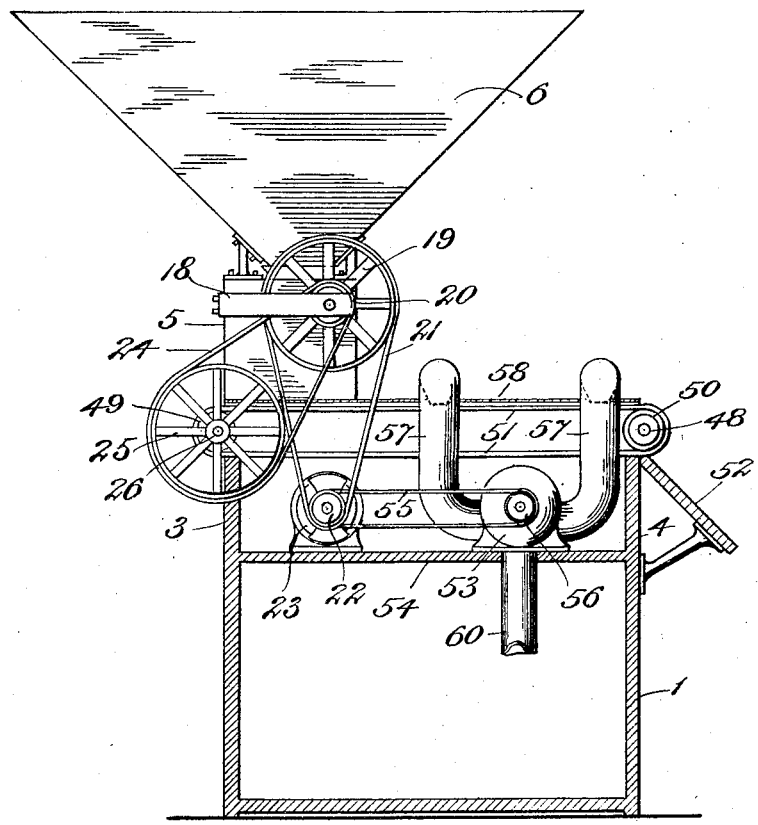
Fig. 1, is a side elevation of a machine constructed upon the principle of my invention, the casing or cabinet being shown in section.
Figure 2:
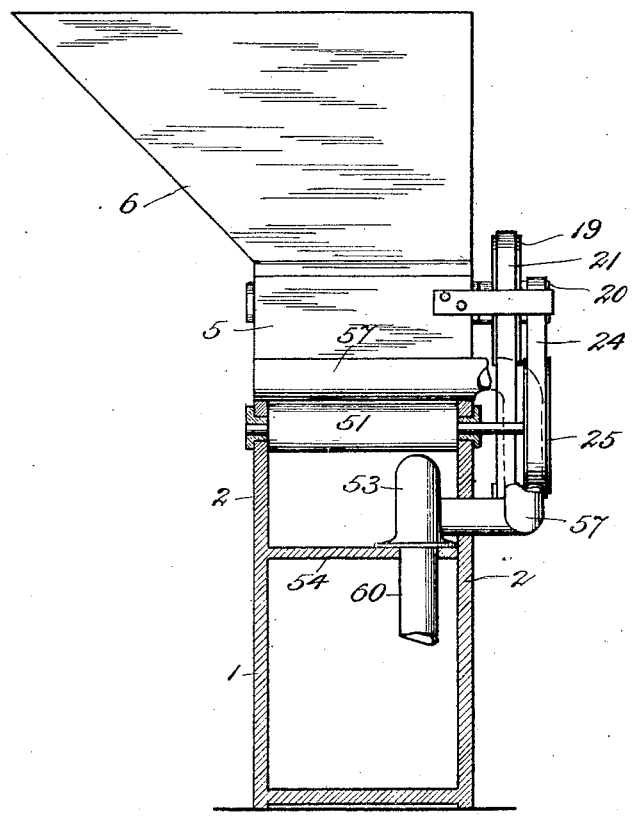
Fig. 2, is what might possibly be termed a rear elevation of such machine, parts being broken away for the sake of clearness and the casing or cabinet shown in transverse section.
Figure 3:
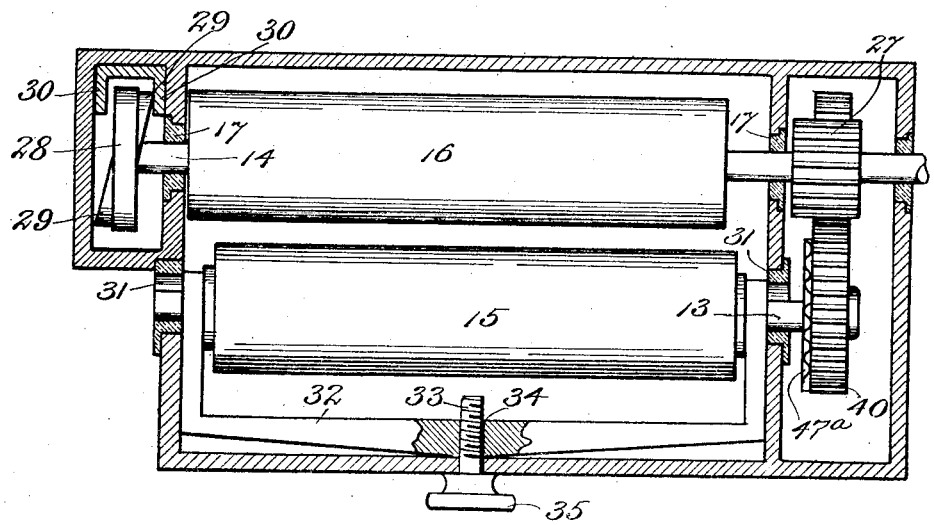
Fig. 3, is a horizontal sectional view taken on the line 3—3 of Fig. 6.
Figure 4:
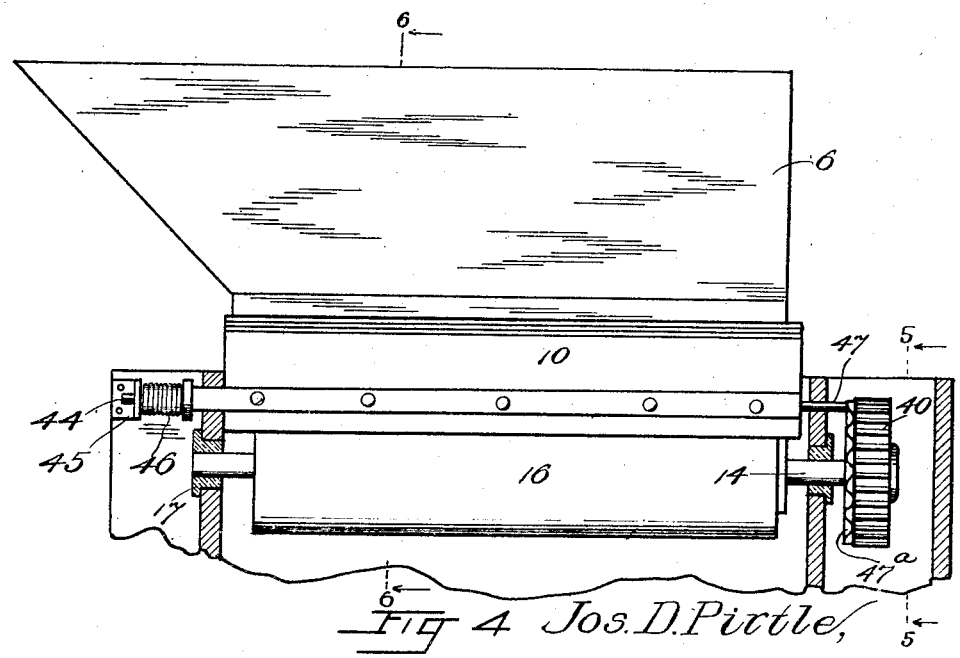
Fig. 4, is a vertical transverse sectional view taken on the line 4—4 of Fig. 3.

The operation of removing the skins from the kernels of nuts, for example, almonds, is as follows: The nuts are first scalded sufficiently to loosen the skins and fed in suitable quantities into the hopper or hoppers 6, as the case may be. The agitating-plates serve to loosen the mass of nuts within the hoppers and feed them in rows to the feed-rolls 10. These rolls are distanced apart sufficiently to permit the nuts to pass between the same only when said nuts are presented to the rolls with their flat or broadest sides against the rolls. While in this position the nuts pass from the feed-rolls to the point between the skinning rolls 15 and 16. As before stated, these latter rolls operate or rotate at different speeds, the faster roll reciprocates axially during its rotation, and I have found by experience that a relative speed of three to one for the relative rotations of the rolls and one complete reciprocation or movement in one axial direction and return for each revolution, which would obviously result from the construction of the cam shown in Figure 3, is sufficient. The roll 15 moving slower than the roll 16, it will be evident that the nut is held by the former roll while the skin is removed by the companion-roll, said nut being caught between the soft elastic surfaces of the two rolls. The result of this is that the kernel pops from the skin upwardly against the top of the frame 5 and drops upon the delivery-apron 55 that runs continuously from front to rear of the machine. The skinned nuts fall from the rear end of the delivery-apron to the delivery-board 52 into any receptacle placed thereunder. The hulls being damp, adhere more or less to the de-hulling rolls 15 and 16, and mainly drop therefrom without further aid to the delivery-apron 58. Some hulls however have a tendency to continue around with the rolls 15 and 16, and in order to provide for a removal of these, I may employ inclined scrapers 59, the same being secured to a convenient part of the frame 5 and having their free ends in close relation with the surfaces of the rolls.

As the skins thus removed from the nuts arrive under the ends of the pipes 57, said skins being lighter than the nuts, are sucked up by the pipes and carried by the latter to a point below the delivery-belt and ejected from the machine through a discharge-pipe 60. If preferred any other means may be employed for separating the skins and nuts.

As heretofore suggested, the nuts, in this instance, almonds, can only enter between the rotating skinning rolls flat-wise, so that the two halves of the nut are held together by the yielding surfaces of the rolls during the operation of de-hulling and therefore there is no tendency to separate the halves of or split the nut and the latter is discharged whole from the machine with but very few exceptions. This would not be true but for the means provided for presenting the nut flat-wise to the surfaces of the skinning rolls, as if otherwise presented, the pinching effect upon the nuts necessary to pop them from their skins would have a tendency to force the halves of the nut apart so that a large percentage of the nuts would emerge from the machine separated and their value thereby decreased. This removal of the skins is greatly facilitated by the reciprocations of one of the rolls, such movement tending to loosen the skins or hulls from the kernels.

From the foregoing description in connection with the accompanying drawings, it will be evident that I have accomplished the several objects of my invention and succeeded in producing a machine comparatively cheap and of simple construction that may be substituted successfully for the hand-labor now believed necessary and employed in the removal of skins from nuts—especially almonds—and this too without a lowering of the value of the skinned nut by a breakage or separation of the halves composing the kernels.

Having described my invention, what I claim, is:

1. In a machine for removing the skins of nut kernels or the like, a pair of resiliently surfaced members between which the kernels are passed, and means for imparting feeding movements to said members; one of said members having a surface movement at the place of acting upon the kernel, which causes the surface to act upon the skin of the kernel partly in the direction of feed and also in a substantial measure in a direction at a substantial angle to the feed.

2. In a machine for removing the skins from nut kernels, the combination of a pair of spaced members having inherent resiliency sufficient to permit the kernels to imbed themselves in the members, means for imparting movement to one of said members in the direction of feed, means for imparting movement to the other of said members in both the direction of feed and a direction at a substantial angle thereto.

3. In a machine for removing the skins from nut kernels, the combination of a pair of spaced members having inherent resiliency sufficient to permit the kernels to imbed themselves in the members, means for imparting movement to one of said members in the direction of feed, and means for imparting movement to the other of said members in both the direction of feed and a direction at a substantial angle thereto; the rate of movement of the last named member in the direction of feed being greater than the movement of the member first named in said direction.

4. In a machine for removing the skins from the kernels of almonds or the like, the combination of a roll having a surface of material which permits partial imbedding of the kernel therein, means for revolving said roll in a direction to feed kernels past the same, a member co-acting with said roll and having a relation thereto which permits kernels to pass between them during such feed, and means imparting movement to the cooperating member in both the direction of feed and in a direction at a substantial angle thereto.

5. In a machine for removing the skins from the kernels of almonds or the like, the combination of a roll having a surface of material which permits partial imbedding of the kernel therein, means for revolving said roll in a direction to feed kernels past the same, a member co-acting with said roll and having a relation thereto which permits kernels to pass between them during such feed, and means imparting movement to the cooperating member in both the direction of feed and in a direction at a substantial angle thereto; the rate of movement of the last mentioned member in the direction of feed being substantially greater than the surface movement of the roll.

6. In a machine for removing the skins of almonds or the like, the combination of a pair of resiliently surfaced members, and means for driving said members; the effective surface movement of one of said members being at a substantial lateral angle to that of the other member.

7. In a machine for removing the skins from almonds or the like, the combination of a pair of co-acting resiliently surfaced rotary members, one of which has a surface movement in the direction of feed of the almonds between the members, and the other of which has a movement one component of which is in said direction of feed, and the other component of which is in a direction at a substantial lateral angle thereto.

8. In mechanism for blanching almonds or the like, the combination of a pair of resiliently surfaced rolls, means for imparting rotation to said rolls, and means for reciprocating one of said rolls in the direction of its axis, during its rotation.

9. In mechanism for blanching almonds or the like, the combination of a pair of resiliently surfaced rolls, means for imparting rotation to said rolls, and means for reciprocating one of said rolls in the direction of its axis, during its rotation; the rotary speed of the reciprocated roll being substantially greater than of the roll with which it co-acts.

10. In mechanism for blanching almonds or the like, the combination of a pair of resiliently surfaced rolls, means for imparting rotation to said rolls, and means for reciprocating one of said rolls in the direction of its axis, during its rotation; the reciprocating roll having one complete reciprocation for each revolution.

JOSEPH D. PIRTLE.